(12) United States Patent
Bürg et al.

(10) Patent No.: US 12,204,829 B1
(45) Date of Patent: *Jan. 21, 2025

(54) ACCURACY OF NUMERICAL INTEGRATION IN MATERIAL POINT METHOD-BASED GEOTECHNICAL ANALYSIS AND SIMULATION BY OPTIMIZING INTEGRATION WEIGHTS

(71) Applicant: Bentley Systems, Incorporated, Exton, PA (US)

(72) Inventors: Markus Bürg, The Hague (NL); Liang Jin Lim, Pahang (MY)

(73) Assignee: Bentley Systems, Incorporated, Exton, PA (US)

( * ) Notice: Subject to any disclaimer, the term of this patent is extended or adjusted under 35 U.S.C. 154(b) by 848 days.

This patent is subject to a terminal disclaimer.

(21) Appl. No.: 17/347,399

(22) Filed: Jun. 14, 2021

(51) Int. Cl.
*G06F 30/23* (2020.01)
*G06F 111/10* (2020.01)

(52) U.S. Cl.
CPC .......... *G06F 30/23* (2020.01); *G06F 2111/10* (2020.01)

(58) Field of Classification Search
CPC .............................. G06F 30/23; G06F 2111/10
USPC .......................................................... 703/10
See application file for complete search history.

(56) References Cited

U.S. PATENT DOCUMENTS

| | | | | |
|---|---|---|---|---|
| 6,678,642 B1* | 1/2004 | Budge | ...................... | G06F 30/23 703/2 |
| 8,612,186 B2* | 12/2013 | Wu | ........................ | G06F 30/23 703/2 |
| 9,323,503 B1* | 4/2016 | Fontes | ...................... | G06F 8/34 |
| 10,019,827 B2* | 7/2018 | Selle | ........................ | G06T 13/60 |
| 10,210,287 B2* | 2/2019 | Selle | ........................ | G06F 30/20 |
| 11,232,648 B1* | 1/2022 | Bürg | ........................ | G06F 30/23 |
| 11,475,184 B1* | 10/2022 | Mlika | ...................... | G06F 30/12 |
| 11,530,581 B2* | 12/2022 | Meier | ...................... | E21B 21/08 |
| 11,947,883 B1* | 4/2024 | Bürg | .................... | G06T 17/205 |

(Continued)

OTHER PUBLICATIONS

Bürg et al. ("Application of a second-order implicit material point method", Elsevier, 2017, pp. 279-286) (Year: 2017).*

(Continued)

*Primary Examiner* — Iftekhar A Khan
(74) *Attorney, Agent, or Firm* — Cesari and McKenna, LLP; James A. Blanchette (57) ABSTRACT

In one embodiment, a technique for numerical integration in material point method (MPM)-based geotechnical analysis and simulation is provided. Input terms for an element of a background mesh are received. The input terms including material points in the element that describe a continuum of soil, rock and/or groundwater. A set of constraints is created that defines an optimization problem. The set of constraints provide that numerical integration of the material points weighted by unknown integration weights equal exact integration for finite element shape functions. The optimization problem defined by the constraints is solved by an optimization algorithm to minimize numerical integration error for polynomials up to a given order to produce a set of integration weights. The set of integration weights is scaled to conserve the mass of the material points to produce optimized integration weights. The optimized integration weights are used in numerical integration performed in MPM-based geotechnical analysis and simulation.

20 Claims, 3 Drawing Sheets

(56) References Cited

U.S. PATENT DOCUMENTS

| | | | |
|---|---|---|---|
| 2012/0253756 A1* | 10/2012 | Favier | G06T 13/20 703/2 |
| 2013/0096890 A1* | 4/2013 | Vanderheyden | G01V 1/00 703/2 |
| 2013/0282348 A1* | 10/2013 | Liu | G01V 20/00 703/10 |
| 2014/0222405 A1* | 8/2014 | Lecerf | E21B 43/17 703/10 |
| 2014/0303950 A1* | 10/2014 | Houeto | E21B 43/00 703/10 |
| 2015/0205756 A1* | 7/2015 | Bouchard | G06F 17/10 708/444 |
| 2016/0210384 A1* | 7/2016 | Stomakhin | G06F 30/20 |
| 2017/0017737 A1* | 1/2017 | Hirose | G06F 30/20 |
| 2017/0145793 A1* | 5/2017 | Ouenes | G06F 17/18 |
| 2020/0190923 A1* | 6/2020 | Meier | E21B 21/08 |
| 2021/0299866 A1* | 9/2021 | Felip Leon | B25J 9/1661 |
| 2021/0357555 A1* | 11/2021 | Liu | G06F 30/27 |

OTHER PUBLICATIONS

Sulsky et al. ("Improving the Material-Point Method", Springer, 2016, pp. 217-240) (Year: 2016).*

Steffen et al. (Analysis and Reduction of Quadrature Errors in the Material Point Method (MPM),2008, John Wiley & Sons, pp. 1-27) (Year: 2008).*

Chen et al. (Improved coupling of finite element method with material point method based on a particle-to-surface contact algorithm, Comput. Methods Appl. Mech. Engrg. 293 (2015) 1-19) (Year: 2015).*

Beuth, Lars, "Formulation and Application of a Quasi-Static Material Point Method", PhD thesis, 2012, Universität Stuttgart, Feb. 14, 2012, pp. 1-161.

Gong, Ming, "Improving the Material Point Method", PhD thesis, 2015, University of New Mexico, UNM Digital Repository, Sep. 1, 2015, pp. 1-116.

U.S. Appl. No. 17/101,556, filed Nov. 23, 2020 by Markus Bürget al. for Systems, Methods. And Media for Modifying a Mesh for a Material Point Method Utilized for Geotechnical Engineering, pp. 1-52.

U.S. Appl. No. 17/103,181, filed Nov. 24, 2020 by Markus Bürg for Systems, Methods, and Media for Generating a Signed Distance Field to a Surface of a Point Cloud for a Material Point Method Utilized for Geotechnical Engineering, pp. 1-50.

U.S. Appl. No. 17/166,309, filed Feb. 3, 2021 by Liang Jin Lim et al. for Systems, Methods, and Media for Generating Spawned Material Points for a Material Point Method Utilized for Geotechnical Engineering, pp. 1-43.

U.S. Appl. No. 17/222,138, filed Apr. 5, 2021 by Liang Jin Lim et al. for Systems, Methods, and Media for Relaxing a Region of a Mesh for a Material Point Method Utilized for Geotechnical Engineering, pp. 1-41.

U.S. Appl. No. 17/347,292, filed Jun. 14, 2021 by Markus Burg et al. for Using Hierarchical Finite Element Shape Functions in Material Point Method-Based Geotechnical Analysis and Simulation, pp. 1-32.

Zienkiewicz, O.C. ,et al., "Chapter 8: 'Standard' and hierarchical Element Shape Functions: Some General Families of $C_0$ Continuity," The Finite Element Method: Its Basis and Fundamentals, Sixth edition, Elsevier Butterworth-Heinemann, Sixth edition, 2005, pp. 164-199.

* cited by examiner

ACCURACY OF NUMERICAL INTEGRATION IN MATERIAL POINT METHOD-BASED GEOTECHNICAL ANALYSIS AND SIMULATION BY OPTIMIZING INTEGRATION WEIGHTS

BACKGROUND

Technical Field

The present disclosure relates generally to geotechnical analysis and simulation, and more specifically to techniques for improving accuracy of numerical integration in material point method-based geotechnical analysis and simulation.

Background Information

Geotechnical engineering involves applying scientific methods and engineering principles to acquire, interpret and use knowledge regarding the Earth's crust to solve engineering problems and design structures. As part of this task, geotechnical engineering software is often used to model soil, rock and/or groundwater, and such models are analyzed and simulated to derive useful predictions regarding the behavior, including deformation, stability, interactions, and the like. Geotechnical analysis and simulation may be used for a variety of useful purposes, including predicting, preventing or mitigating natural hazards (e.g., avalanches, landslides, volcanic eruptions, etc.); designing and predicting performance of man-made earthen structures (e.g., earthen dams); and/or designing and predicting performance of man-made structures whose foundations are built upon earth (e.g., buildings, bridges, concrete dams, towers, etc.).

A variety of numerical methods may be used by geotechnical engineering software to model soil, rock and/or groundwater and perform geotechnical analysis and simulation thereof. One longstanding method is the finite element method (FEM). In FEM a continuum of soil, rock and/or groundwater is described by a mesh composed of discrete geometric elements (e.g., areas such as triangles and quadrilaterals; volumes; etc.) formed from nodes which carry information related to a boundary value problem to be solved.

A newer method is the Material Point Method (MPM). MPM may be particularly well suited for analysis and simulation where there are large deformation behaviors, post-liquefaction behaviors (e.g., the post-failure liquid-like behaviors of landslides), penetrations (such as in cone penetration testing (CPT) and pile installation), and/or scouring behaviors (e.g., such as with underwater pipelines). In MPM, a continuum of soil, rock and/or groundwater is described by a number of Lagrangian elements referred to a "material points" which are associated with information (e.g., mass, volume, stress, state variables (such as velocity and acceleration), etc.) according to the material it represents. The material points are surrounded by a computational mesh (referred to as a "background mesh") composed of elements formed from nodes, that extends over the continuum. As the analysis and simulation proceeds over time steps, the material points are tracked and their states updated so that they carry the complete solution. To determine the motion of the material points in an efficient manner, information from the material points may be projected onto the background mesh. Equations may be solved on the background mesh and the solution on the background mesh then used to update the material points, across time steps. The background mesh may be restored to its original location at the end of each time step. In this way, mesh entanglement may be avoided and. As a result of this property. MPM is often categorized as a "meshless" or "meshfree" method.

Similar to FEA, in MPM a numerical integration is typically performed over each element at each time step of the analysis or simulation to obtain the entries of a system matrix and right-hand side vector. The numerical integration is typically applied to the position of the material points in the element, weighted by integration weights, and adjusted by shape functions that interpolate the solution between the discrete points. In general, numerical integration (sometime called "numerical quadrature") replaces an integral by a sum, where an integrand is sampled at a number of discrete integration points. The choice of a numerical integration method may determine both the position of material points within each element, as well as integration weights associated with each point. Numerical integration methods are typically categorized by orders (e.g., 1, 2, 3 . . . n) which correspond to the degree of polynomial that the method can represent accurately. In FEA, higher-order integration methods may be chosen to achieve accuracy. However, in MPM, material points move through the elements of the background mesh during analysis and simulation. Since position of the material points is unknown beforehand, with existing techniques, it is generally not possible to use higher-order numerical integration methods. Only a lowest-order numerical integration method that weights each integration point equally generally may be employed.

The restriction to a lowest-order numerical integration method with equal weights has hindered the adoption of MPM in geotechnical engineering software. Despite MPM typically using a larger number of integration points as compared to FEA, the lowest-order numerical integration is still typically less accurate. This may result in a less accurate numerical solution than can be achieved by FEA for the same analysis or simulation.

Previous approaches to address this issue have suffered shortcomings. Some approaches have involved extrapolating information from material points to nodes of the elements of the background mesh and then interpolating them onto specially-created, more-suitable, integration points. While such inter-extrapolation approaches may permit use of higher-order numerical integration methods, they introduced their own numerical inaccuracies. Transferring information from material points to specially-created integration points introduces error as the interpolated information is only an approximation of the original information. Also, it is only feasible for elements that are fully covered by material points. For elements that are only partially covered by material points, an inaccurate lowest-order numerical integration method with equal integration weights has previously still been used.

Accordingly, there is a need for new techniques to improve accuracy of numerical integration in MPM-based geotechnical analysis and simulation.

SUMMARY

In one or more embodiments, new techniques are provided to improve accuracy of numerical integration in MPM-based geotechnical analysis and simulation which optimize integration weights. The original material points may be used for integration (optimized integration weights being directly applied to them), avoiding inter-extrapolation inaccuracies. The optimization may produce differing weights for each material point, avoid inaccuracies of lowest-order numerical integration with all equal weights. Further, the techniques may be used with all elements of a background mesh, including those that are only partially covered by material points, avoiding the need to revert to less accurate techniques for some elements.

The techniques may be roughly divided into three phases, which may be performed by a numerical integration sub-module of geotechnical engineering software for each element of a background mesh. In a first phase, a set of constraints is created that defines an optimization problem. In general, the set of constraints may provide that numerical integration of material points in the element weighted by unknown integration weights should equal exact integrations for finite element shape functions. In a second phase, the optimization problem defined by the constraints is solved. An optimization algorithm may minimize numerical integration error for polynomials up to a given order to produce a set of integration weights. In the third phase, the integration weights are scaled to conserve mass of the material points to produce optimized integration weights. The optimized integration weights may thereafter be used in a numerical integration performed in MPM-based geotechnical analysis and simulation, and the results of such MPM-based geotechnical analysis and simulation may be displayed by the geotechnical engineering software in a user interface, stored to an computing device-readable medium, or otherwise used.

It should be understood that a variety of additional features and alternative embodiments may be implemented other than those discussed in this Summary. This Summary is intended simply as a brief introduction to the reader for the further description that follows and does not indicate or imply that the examples mentioned herein cover all aspects of the disclosure or are necessary or essential aspects of the disclosure.

BRIEF DESCRIPTION OF THE DRAWINGS

The description below refers to the accompanying drawings of example embodiments, of which.

DETAILED DESCRIPTION

Figure 1:
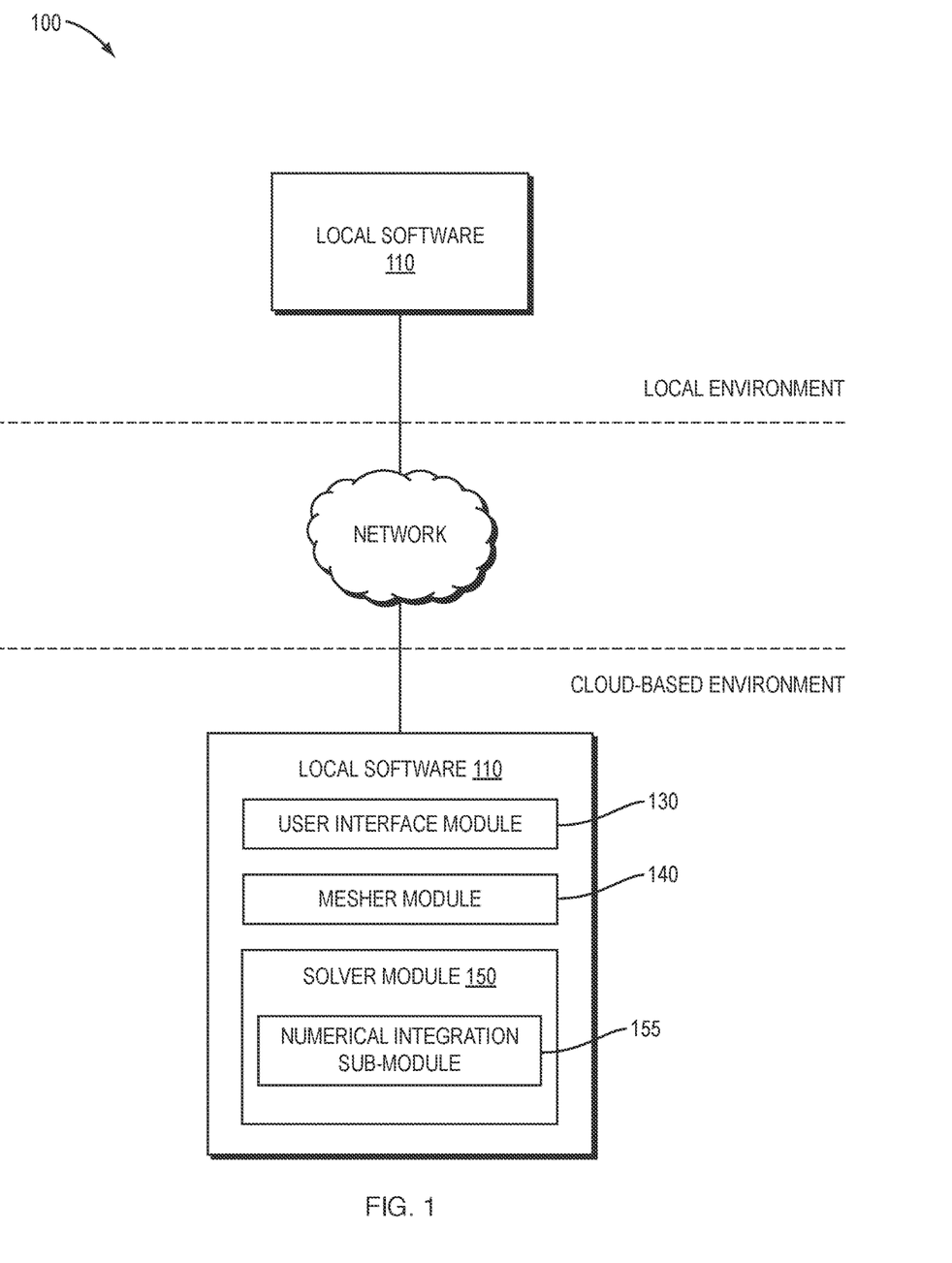
FIG. 1 is a high-level block diagram of an example software architecture for geotechnical engineering software that may perform MPM-based geotechnical analysis and simulation.

FIG. 1 is a high-level block diagram of an example software architecture 100 for geotechnical engineering software that may perform MPM-based geotechnical analysis and simulation. The geotechnical engineering software may be a stand-alone software application or a component of a larger software application. In one example implementation, the geotechnical engineering software is the PLAXIS®3D geotechnical engineering software available from Bentley Systems of Exton, PA. However, it should be understood that the geotechnical engineering software may take a variety of other forms.

The geotechnical engineering software may be divided into local software 110 that executes on one or more computing devices local to an end-user (collectively "local devices") and, in some cases, cloud-based software 120 that is executed on one or more computing devices remote from the end-user (collectively "cloud computing devices") accessible via a network (e.g., the Internet). Each computing device may include processors, memory/storage, a display screen, and other hardware (not shown) for executing software, storing data and/or displaying information. The local software 110 may include a number of software modules operating on a local device and the cloud-based software 120, if present, may include, additional software modules operating on cloud computing devices. Tasks may be divided in a variety of different manners among the software modules. For example, in one implementation, software modules of the local software 110 may be responsible for performing non-processing intensive operations and software modules of the cloud-based software 120 may perform more processing intensive operations. However, many other arrangements may be employed.

The software modules may include a user interface module 130, a mesher module 140 and a solver module 150. The user interface module 130 may be responsible for providing a user interface (e.g., a graphical user interface and/or a command line interface,) for receiving user input and displaying output. The mesher module 140 may be responsible for generating a computational mesh (background mesh) composed of elements formed from nodes that model a continuum of soil, rock and/or groundwater, for example based on information (e.g., a model, geometric description, parameters/conditions, etc.) selected or provided in the user interface. The solver module 150 may be responsible for using MPM to analyze and simulate behavior (e.g., deformation, stability, interactions, and the like) of the soil, rock and/or groundwater. To that end, the solver module 150 may associate material points with information (e.g., mass, volume, stress, state variables, etc.) and move the material points through elements of the background mesh over time steps of analysis and simulation. The solver module may include a numerical integration sub-module 155 that is used in these operations. Results of the analysis and simulation may be displayed by the user interface module 130, stored in a file, database, etc., provided to other software, sand the like.

Figure 2:
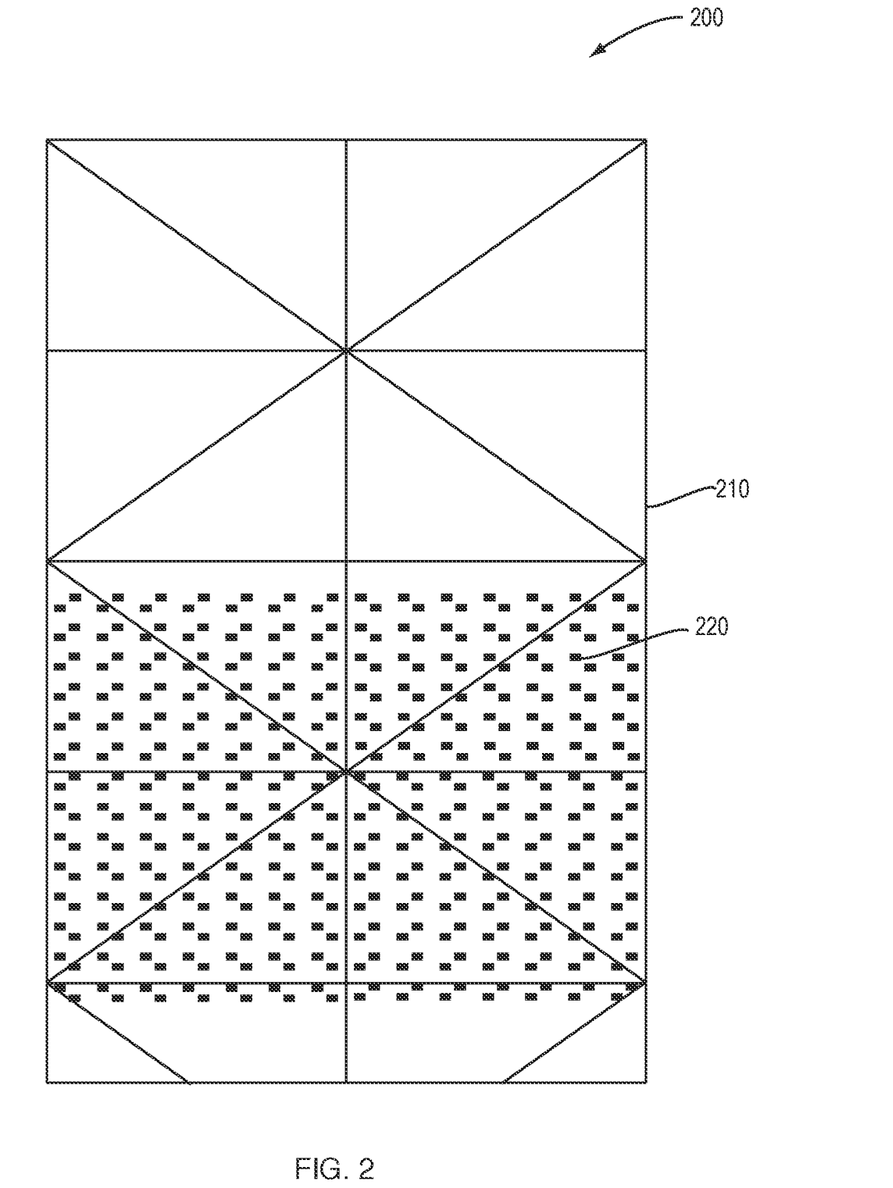
FIG. 2 is a diagram of an example computational mesh (background mesh) and material points.

FIG. 2 is a diagram 200 of an example computational mesh (background mesh) 210 and material points 220 that may assist in understanding the operation of the mesher module 140 and solver module 150. The background mesh 210 and material points 220 may represent a continuum of soil, rock and/or groundwater. The background mesh 210 is composed of elements (e.g., triangles) formed from nodes. The material points 220 are distributed within the elements. Some elements 210 may be fully covered by material points, while other elements may be only partially covered.

When performing MPM-based geotechnical analysis and simulation using a background mesh and material points such as shown in the example in FIG. 2, the solver module 150, working together with a numerical integration sub-module 155, may perform numerical integration over each element at each time step of the analysis or simulation to obtain entries of a system matrix and right-hand side vector. An example integration may be given as:

$$\int_K N_i \approx \Sigma_p w_p N_i(x_p)$$

where K is an element of the background mesh, $N_i$ is a finite element shape function, $x_p$ is the position of a material point p, and $w_p$ is the integration weight of the material point p.

In one or more embodiments, the accuracy of such a numerical integration used is improved by using optimized integration weights. The original material points may be used for integration, rather than inter-extrapolating information from material points to nodes of the elements of the background mesh. Differing weights for each material point may be used, rather than using all equal weights.

Figure 3:
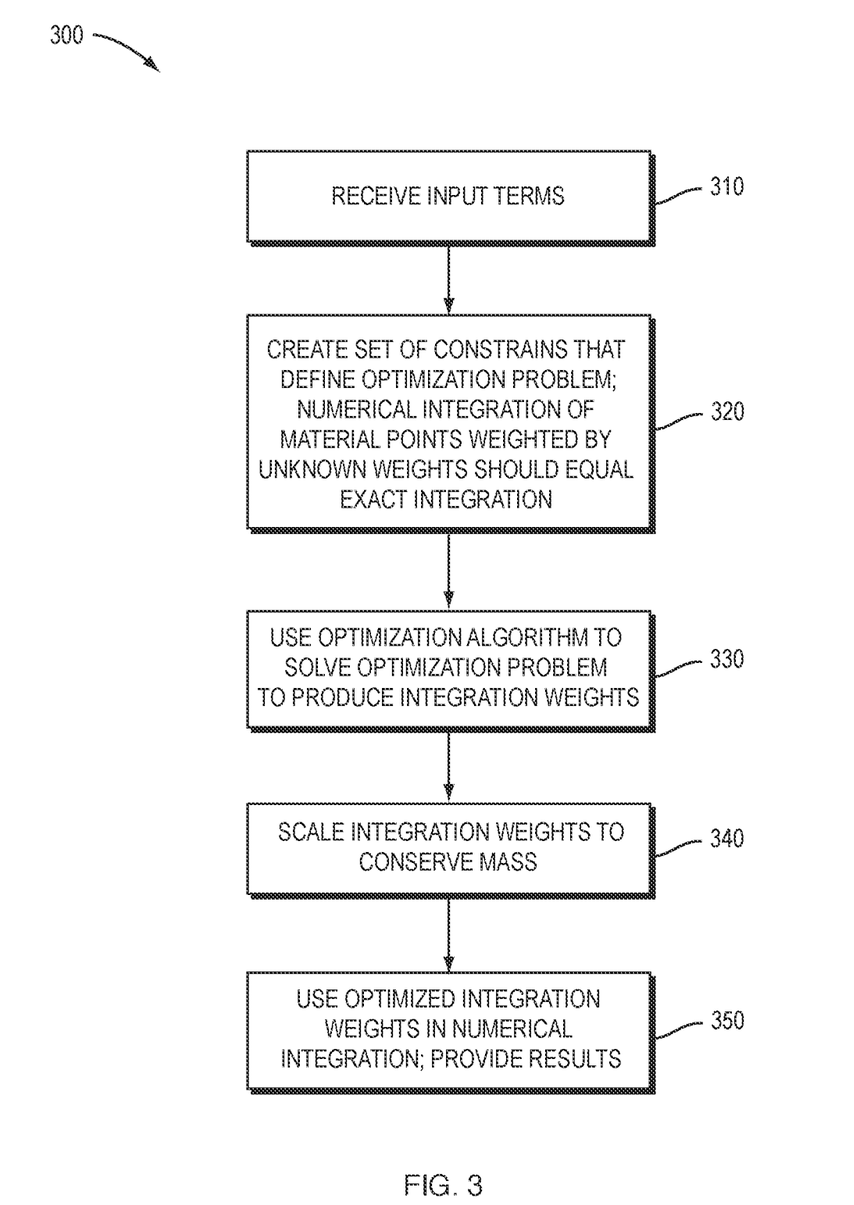
FIG. 3 is a flow diagram of an example sequence of steps that may be performed to improve accuracy of numerical integration by optimizing integration weights.

FIG. 3 is a flow diagram of an example sequence of steps 300 that may be performed by the geotechnical engineering software to improve accuracy of numerical integration by optimizing integration weights. The sequence of step 300 are described in relation to a single element, however it should be understood that such steps may be executed in a loop (or in parallel) over all non-empty elements of a background mesh. At step 310, the numerical integration sub-module 155 receives input terms (e.g., from the solver module 150) for the element. The input terms may include positions of the material points $x_1, x_2, \ldots, x_n$ in the element, a signed distance field L, and an original total mass mx of the material points in the element. The signed distance field L is a continuous function that indicates the distance of a given point x from the boundary of a point cloud defined by the material points, with the sign determined by whether it is outside or inside the point cloud (e.g., positive outside and negative inside). The zero iso-surface of the signed distance field describes the surface of the point cloud. In one implementation, the signed distance field may be a level-set field. However, it should be understood that it may also take other forms.

At step 320, the numerical integration sub-module 155 creates a set of constraints that define an optimization problem. Since the number of constraints usually does not coincide with the number of integration weights to be determined, the resulting system generally cannot be solved directly, hence it is considered an optimization problem. In general, the constraints may provide that numerical integration of the material points weighted by unknown integration weights equal exact integration for finite element shape functions.

To further understand the operation of step 320, the numerical integration may be examined in more detail. As discussed above, in numerical integration a sum replaces an integral such that the integrand is sampled at a number of discrete integration points. As such, if a function $f$ is integrated over an integration domain 22, numerical integration may be represented as:

$$\int_\Omega f \approx \Sigma_p w_p f(x_p)$$

where $\{x_p\}$ are the positions of integration points (here, the positions of material points) and $\{w_p\}$ are the integration weights. Basically, the function $f$ is evaluated at the integration points (material points) and the obtained function values are weight-accumulated with respect to the integration weights. The integration weights may depend on the volume of the integration domain £2 as well as the chosen numerical integration method. Typically, integration weights are different for each integration point in an accurate higher-order numerical integration method (e.g., Gauss quadrature).

When numerical integration is used to obtain the entries of the system matrix and right-hand side vector, the integration domain £2 may be chosen to be the region (e.g., area, volume, etc.) of element K that is covered by the material point cloud (i.e. inside or on the surface of the material point cloud). In other words, the part of K in which the signed distance function L is negative, may be represented as:

$$\Omega = \{x \in K : L(x) \leq 0\}.$$

A set of constraints may be constructed that ensures that polynomials up to order k can be integrated accurately in the element.

To construct the set of constraints, function $f$ may be chosen from finite element shape functions $N_0, \ldots, N_m$ up to order k, such that there are m+1 possible finite element shape functions. The finite element shape functions may be generated as "standard" shape functions or "hierarchical" shape functions. In a simple example, shape functions in various orders may be generated by products of appropriate polynomials of the coordinate system of the element. In other examples, shape functions may be generated to be dependent on nodal values placed on the element boundary. It should be understood that a wide variety of known techniques may be used to generate the finite element shape functions, and that the present disclosure is not limited to use with one family or category of shape function.

With m+1 possible finite element shape functions, in one implementation, a set of constraints may be defined as:

$$\sum_{i=1}^n w_i \phi_0(p_i) = \int_\Omega \phi_0 -$$
$$\vdots$$
$$\sum_{i=1}^n w_i \phi_m(p_i) = \int_\Omega \phi_m -.$$

On the right-hand side, we have an exact integration of finite element shape functions $\phi_0 \ldots \phi_m$ over a domain $\Omega$ equal to the extent (e.g., area) of the element. The exact integration may be obtained, for example, by a very dense subdivided Gauß integration, or another integration technique. On the left-hand side we have a numerical integration of the shape functions $\phi_0, \ldots, \phi_m$ using the provided set of material points $p_1, \ldots, p_n$ and yet unknown integration weights $w_1, \ldots, w_n$ for each of n material points Such a set of constraints may be written in a matrix-vector notation as Aw=b, where:

$$A = \begin{pmatrix} \phi_0(p_1) & \cdots & \phi_0(p_n) \\ \vdots & & \vdots \\ \phi_m(p_0) & \cdots & \phi_m(p_n) \end{pmatrix}$$

is a m+1 by n+1 matrix, and:

$$b = \begin{pmatrix} \int_\Omega \phi_0 \\ \int_\Omega \phi_0 \\ \int_\Omega \phi_m \end{pmatrix}$$

is a right-hand side vector, and w is a sought vector of integration weights.

While the specific definitions above may provide constraints that ensure numerical integration of the material points weighted by unknown integration weights equal exact integration for finite element shape functions, it should be understood that in other implementations other specific definitions may be used, and that the techniques are not limited to these specific definitions.

At step 330, the numerical integration sub-module 155 uses an optimization algorithm to solve the optimization problem created in step 320. The optimization algorithm may minimize numerical integration error for polynomials up to a given order to produce a set of integration weights.

A variety of different optimization algorithms may be employed. In one implementation, the optimization algorithm is a least-squares algorithm that attempts to minimize the quadratic error in the Euclidean norm (the square root of the sum of the squares of the coordinates) given as:

$$\min_{w} \|Aw - b\|_2^2$$

where, A is the m+1 by n+1 matrix, w is the vector of integration weights, and b is the right-hand side vector.

In general, it may be desirable that integration weights $w_1, \ldots, w_n$ be non-negative (i.e. $w \geq 0$) to ensure numerical stability of the integration method. Therefore, the above optimization problem may be modified to also include this constraint, and thus be given as:

$$\min_{w \geq 0} \|Aw - b\|_2^2$$

The optimization problem may be solved using a least-squares algorithm (e.g., using a conventional non-negative least-squares solver) to obtain a set of integration weights $w_1, \ldots, w_n$ that are non-negative and integrate all polynomials of up to degree k on integration domain $\Omega$ as accurately as possible with the given material points $x_1$, $x_2, \ldots, x_n$ subject to integration.

While a least-squares optimization above may be used to solve the optimization problem created in step 320, it should be understood that other optimization algorithms may be used to solve the problem. For example, the optimization algorithm may be a min-max (Chebyshev) algorithm, a minimum sum algorithm, or another type of optimization algorithm. Such alternative algorithms may use alternative formulations differing from the specific examples shown above.

At step 340, the numerical integration sub-module 155 scales the integration weights to conserve the mass of the material points to produce optimized integration weights. Scaling of the integration weights may ensure that mass of the material points $x_1, x_2, \ldots, x_n$ in element K are preserved. In one implementation, this may be achieved by scaling the optimized integration weights $\{w_p\}$ determined in step 330 with a correction factor. Current total mass m of the material points in the element may be given as:

$$m = \Sigma_p w_p.$$

A correction factor may be given as $$\frac{m_K}{m}$$

where $m_K$ is the original total mass of the material points in the element. The correction factor may be applied to the integration weights (i.e. multiplied against them) to yield optimized integration weights that conserve mass.

While a specific correction factor formulation is provided above, it should be understood that other formulations may be used to produce optimized integration weights that conserve mass.

At step 350, the optimized integration weights determined in step 340 are used by the solver 150 of the geotechnical engineering software in a numerical integration performed as part of MPM-based geotechnical analysis and simulation.

The results of such MPM-based geotechnical analysis and simulation may be displayed by the geotechnical engineering software in a user interface, stored to an computing device-readable medium, or otherwise used.

It should be understood that various adaptations and modifications may be readily made to what is described above, to suit various implementations and environments. While it is discussed above that certain steps may be implemented in a specific sequence, it should be understood that other sequences may be used, and that such sequences may include additional, intervening steps, steps implemented in parallel, and the like. While it is discussed above that aspects of the techniques may be implemented by specific software processes executing on specific hardware, it should be understood that some or all of the techniques may also be implemented by different software on different hardware. In addition to general-purpose computing devices, the hardware may include specially configured logic circuits and/or other types of hardware components. Above all, it should be understood that the above descriptions are meant to be taken only by way of example.

What is claimed is:

1. A method for numerical integration in material point method (MPM)-based geotechnical analysis and simulation, comprising:

receiving, by geotechnical engineering software executing on one or more computing devices, input terms for an element of a background mesh, the input terms including material points in the element that describe a continuum of soil, rock and/or groundwater;

conducting, by the geotechnical engineering software, a MPM-based geotechnical analysis and simulation of the background mesh that includes the element at least in part by:

creating a set of constraints that provide that, for a plurality of finite element shape functions up to a given order, numerical integration of the plurality of finite element shape functions at the material points weighted by unknown integration weights equal exact integration for the plurality of finite element shape functions over an area of the element, wherein the given order is an order greater than one, performing an optimization, by an optimization algorithm of the geotechnical engineering software, based on the set of constraints to determine the unknown integration weights, the optimization algorithm to produce a set of integration weights by minimizing numerical integration error for polynomials up to the given order, scaling the set of integration weights to conserve the mass of the material points to produce optimized integration weights, and performing a given order numerical integration at the material points weighted by the optimized integration weights; and displaying in a user interface, or storing to a computing device-readable medium, results of the MPM-based geotechnical analysis and simulation.

2. The method of claim 1, wherein the background mesh includes a plurality of elements, and at least the receiving, creating, performing the optimization and scaling are performed for each of the plurality of elements.

3. The method of claim 1, wherein the input terms further include a signed distance field whose value depends on location outside or inside a surface of a point cloud defined by the material points, and the set of constraints provide that an integration domain of the numerical integration is a region inside or on the surface of the point cloud.

4. The method of claim 1, wherein the input terms further include an original total mass of the material points in the element, and the scaling comprises applying a difference between the original total mass and current total mass to the set of integration weights.

5. The method of claim 1, wherein the set of constraints include constraints:

$$\sum_{i=1}^{n} w_i \phi_0(p_i) = \int_{\Omega} \phi_0 -$$
$$\vdots$$
$$\sum_{i=1}^{n} w_i \phi_m(p_i) = \int_{\Omega} \phi_m -$$

where n is a number of material points in the element, $w_1, \ldots, w_n$ are integration weights, for material points, $\phi_0 \ldots \phi_m$ are finite element shape functions, $p_1, \ldots, p_n$ are material points and $\Omega$ is an integration domain equal to the extent of the element.

6. The method of claim 1, wherein the optimization algorithm is a least squares algorithm that minimizes quadratic error in the Euclidean norm.

7. The method of claim 1, wherein the optimization algorithm constrains each integration weight of the set of integration weights to be non-negative.

8. The method of claim 1, wherein at least some of the integration weights of the set of optimized integration weights differ from each other.

9. The method of claim 1, wherein the element is only partially covered by material points.

10. The method of claim 1, wherein the performing the given order numerical integration applies the optimized integration weights directly to the material points.

11. A computing device comprising:
a display screen;
a processor; and
a memory coupled to the processor and configured to store geotechnical engineering software, the geotechnical engineering software including
a mesher software module configured to generate a background mesh composed of elements formed from nodes, each element including material points that describe a continuum of soil, rock and/or groundwater,
a solver software module configured to use material point method (MPM) to analyze and simulate behavior of the soil, rock and/or groundwater at least in part by performing a given order numerical integration at the material points on each element, the numerical integration weighted by a set of optimized integration weights, and
a numerical integration software sub-module configured to determine the set of optimized integration weights used to perform the numerical integration by creating a set of constraints that provide that, for a plurality of finite element shape functions up to the given order, numerical integration of the plurality of finite element shape functions at the material points weighted by unknown integration weights equal exact integration for the plurality of finite element shape functions over an area of a respective element, wherein the given order is an order greater than one,
performing an optimization based on the set of the constraints with an optimization algorithm to determine the unknown integration weights, the optimization to produce a set of integration weights by minimizing numerical integration error of polynomials up to the given order, and
scaling the set of integration weights to conserve the mass of the material points to produce the set of optimized integration weights.

12. The computing device of claim 11, wherein the set of constraints provide that an integration domain of the numerical integration is a region inside or on a surface of a point cloud defined by the material points.

13. The computing device of claim 11, wherein the scaling applies a difference between an original total mass and current total mass to the set of integration weights.

14. A non-transitory computing device readable medium having instructions stored thereon, the instructions when executed by one or more computing devices operable to:
receive input terms for an element of a background mesh, the input terms including material points in the element that describe a continuum of soil, rock and/or groundwater;
conduct a material point method (MPM)-based geotechnical analysis and simulation of the background mesh that includes the element at least in part by:
creating a set of constraints that provide that, for a plurality of finite element shape functions up to a given order, numerical integration of the plurality of finite element shape functions at the material points weighted by unknown integration weights equal exact integration for the plurality of finite element shape functions over an area of the element, wherein the given order is an order greater than one,
performing an optimization based on the constraints with an optimization algorithm to determine the unknown integration weights, the optimization algorithm to produce a set of integration weights by minimizing numerical integration error for polynomials up to the given order,
scaling the set of integration weights to conserve the mass of the material points to produce optimized integration weights, and
performing a given order numerical integration at the material points weighted by the optimized integration weights; and
display in a user interface, or store to a computing device-readable medium, results of the MPM-based geotechnical analysis and simulation.

15. The non-transitory electronic-device readable medium of claim 14, wherein the background mesh includes a plurality of elements, and at least the instructions that when executed are operable to receive and conduct are operable to perform operations for each of the plurality of elements.

16. The non-transitory electronic-device readable medium of claim 14, wherein the input terms further include a signed distance field whose value depends on location outside or inside a surface of a point cloud defined by the material points, and the set of constraints provide that an integration domain of the numerical integration is a region inside or on the surface of the point cloud.

17. The non-transitory electronic-device readable medium of claim 14, wherein the input terms further include an original total mass of the material points in the element, and the instructions that when executed are operable to scale include instructions that when executed are operable to apply a difference between the original total mass and current total mass to the set of integration weights.

18. The non-transitory electronic-device readable medium of claim 14, wherein the set of constraints include constraints:

$$\sum_{i=1}^{n} w_i \phi_0(p_i) = \int_{\Omega} \phi_0$$
$$\vdots$$
$$\sum_{i=1}^{n} w_i \phi_m(p_i) = \int_{\Omega} \phi_m$$

where n is a number of material points in the element, $w_1, \ldots, w_n$ are integration weights, for material points, $\phi_0 \ldots \phi_m$ are finite element shape functions, $p_1, \ldots, p_n$ are material points and $\Omega$ is an integration domain equal to the extent of the element.

19. The non-transitory electronic-device readable medium of claim 14, wherein the optimization algorithm is a least squares algorithm that minimizes quadratic error in the Euclidean norm.

20. The non-transitory electronic-device readable medium of claim 14, wherein the optimization algorithm constrains each integration weight of the set of integration weights to be non-negative.

* * * * *

UNITED STATES PATENT AND TRADEMARK OFFICE
CERTIFICATE OF CORRECTION

PATENT NO. : 12,204,829 B1
APPLICATION NO. : 17/347399
DATED : January 21, 2025
INVENTOR(S) : Markus Bürg et al.

It is certified that error appears in the above-identified patent and that said Letters Patent is hereby corrected as shown below:

On the Title Page (72) Inventors:
"Liang Jin Lim, Pahang (MY)"
Should read:
-- Liang Jin Lim, Kuantan (MY) --

In the Specification

Column 5, Line 15:
"distance field L, and an original total mass mx of the material"
Should read:
-- distance field $L$, and an original total mass $m_K$ of the material --

Column 5, Line 41:
"integrated over an integration domain 22, numerical inte-"
Should read:
-- integrated over an integration domain $\Omega$, numerical inte- --

Column 5, Line 43-45:
"$\int \Omega f \approx \Sigma_p w_p f(x_p)$"
Should read:
-- $\int_\Omega f \approx \sum_p w_p f(x_p)$ --

Column 5, Line 52:
"volume of the integration domain £2 as well as the chosen"
Should read:
-- volume of the integration domain $\Omega$ as well as the chosen --

Signed and Sealed this
Twenty-ninth Day of April, 2025

Coke Morgan Stewart
*Acting Director of the United States Patent and Trademark Office*

Column 5, Line 58:
"gration domain £2 may be chosen to be the region (e.g., area,"
Should read:
-- gration domain $\Omega$ may be chosen to be the region (e.g., area, --